US012621875B2

(12) United States Patent
Huang

(10) Patent No.: US 12,621,875 B2
(45) Date of Patent: May 5, 2026

(54) ACCESS METHOD AND RELATED DEVICE

(71) Applicant: HUAWEI TECHNOLOGIES CO., LTD., Shenzhen (CN)

(72) Inventor: Hai Huang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 425 days.

(21) Appl. No.: 18/189,203

(22) Filed: Mar. 23, 2023

(65) Prior Publication Data

US 2023/0232466 A1      Jul. 20, 2023

Related U.S. Application Data

(63) Continuation of application No. PCT/CN2021/118115, filed on Sep. 14, 2021.

(30) Foreign Application Priority Data

Sep. 24, 2020      (CN) .......................... 202011017630.1

(51) Int. Cl.
    *H04W 4/00*        (2018.01)
    *H04W 72/1268*     (2023.01)
    *H04W 74/0833*     (2024.01)

(52) U.S. Cl.
    CPC ..... *H04W 74/085* (2013.01); *H04W 72/1268* (2013.01)

(58) Field of Classification Search
    CPC ........... H04W 74/085; H04W 72/1268; H04W 72/21; H04W 72/23; H04W 74/0841;
    (Continued)

(56) References Cited

U.S. PATENT DOCUMENTS 8,953,535 B2 *   2/2015   Park ...................... H04W 74/08
                                                          370/329
11,818,768 B2 *  11/2023  Sengupta ............ H04W 56/005
                          (Continued)

FOREIGN PATENT DOCUMENTS

CN        106455113 A      2/2017
CN        110268666 A      9/2019
                    (Continued)

OTHER PUBLICATIONS

Wu et al., CN 110769517 B, pp. 1-40 (Year: 2022).*
                    (Continued)

*Primary Examiner* — Phuongchau Ba Nguyen

(57)      ABSTRACT

A network device sends a contention resolution message to a terminal device, and in instances when the network device determines that a target ACK sent by the terminal device is not received on an uplink carrier, the network device sends a first uplink grant message to the terminal device on a data transmission carrier. The terminal device may send a first message to the network device on the data transmission carrier based on the first uplink grant message. In this way, the network device can determine, based on the first message received on the data transmission carrier, whether the terminal device successfully resolves a contention problem, to avoid an access failure caused by missing detection of the target ACK, and improve an access success rate of the terminal device.

9 Claims, 4 Drawing Sheets

(58) Field of Classification Search
CPC ... H04W 74/006; H04W 84/12; H04W 28/04;
H04W 72/04; H04W 72/042; H04W
88/08; H04W 28/08; H04W 28/084;
H04W 36/22; H04W 72/12; H04L 5/001;
H04L 5/0094; H04L 5/0055; H04L
1/1607; H04L 1/1812; H04L 1/1835;
H04L 5/0007
See application file for complete search history.

(56) References Cited

U.S. PATENT DOCUMENTS

| | | | | |
|---|---|---|---|---|
| 12,324,026 | B2 * | 6/2025 | Kwak | H04L 1/1896 |
| 2016/0219624 | A1 * | 7/2016 | Lin | H04W 74/085 |
| 2019/0132882 | A1 * | 5/2019 | Li | H04W 72/23 |
| 2019/0200238 | A1 * | 6/2019 | Yu | H04L 1/1825 |
| 2019/0335515 | A1 | 10/2019 | Chen et al. | |
| 2022/0217787 | A1 * | 7/2022 | Zhang | H04W 74/002 |

FOREIGN PATENT DOCUMENTS

| | | | | |
|---|---|---|---|---|
| CN | 111491393 | A | 8/2020 | |
| CN | 111935813 | A * | 11/2020 | ........ H04W 56/0055 |
| CN | 110769517 | B * | 2/2022 | ........... H04W 72/21 |
| EP | 2152045 | B1 | 10/2016 | |
| WO | 2019160481 | A1 | 8/2019 | |

OTHER PUBLICATIONS

Liu et al., CN 111935813 A, pages (Year: 2020).*
LG Electronics Inc., Impact of UL HARQ ACK feedback. 3GPP
TSG-RAN WG2 Meeting #102, Busan, Republic of Korea, May
21-25, 2018, R2-1808539, 4 pages.
Nokia, Nokia Shanghai Bell, On 2-step RACH Procedure. 3GPP
TSG RAN WG1 #96bis, Xi'an, China, Apr. 8-12, 2019, R1-1904716,
16 pages.

* cited by examiner

101 —

Network
device

102

Terminal device

103

Terminal device

104

Terminal device

ACCESS METHOD AND RELATED DEVICE

CROSS-REFERENCE TO RELATED APPLICATIONS

This application is a continuation of International Application No. PCT/CN2021/118115 filed on Sep. 14, 2021, which claims priority to Chinese Patent Application No. 202011017630.1 filed on Sep. 24, 2020. The disclosures of the aforementioned applications are hereby incorporated by reference in their entireties.

TECHNICAL FIELD

Embodiments of this disclosure relate to the communication field, and in particular, to an access method and a related device.

BACKGROUND

Narrowband internet of things (NB-IoT) is a technology that can be widely used around the world, and is also an important branch of internet of everything. The NB-IoT features wide coverage, a large quantity of connections, a high rate, low costs, low power consumption, an excellent architecture, and the like.

A terminal device having a multi-carrier random access channel (RACH) access capability selects an available physical random access channel (PRACH) resource, namely, a physical resource block (PRB), between an anchor carrier and an uplink non-anchor carrier. If the resource block selected by the terminal device is a PRB 1, a corresponding downlink non-anchor (DL non-anchor) carrier of the PRB 1 in a configuration of a system information block (SIB) 22 is a PRB 2. A base station configures, through a message 4 (msg4), the terminal device on another carrier PRB 3 to transmit a message 5 (msg5). In addition, subsequent service-related signaling and data between the base station and the terminal device are all transmitted on the PRB 3. In the foregoing RACH procedure, after the base station sends the msg4 to the terminal device, to ensure that the terminal device successfully receives the msg4, the terminal device returns a msg4 acknowledge character (ACK) to the base station. If the base station does not receive the msg4 ACK sent by the terminal device, the base station considers that the terminal device has not resolved a contention problem, and still retransmits the msg4 to the terminal device on the PRB 2.

If the terminal device has received the msg4, but the network device does not receive the msg4 ACK from the terminal device due to factors such as a poor uplink signal, strong uplink interference, or the like, the base station retransmits the msg4 on the PRB 2. However, the terminal device needs to send the msg5 on the PRB 3, so the terminal device monitors a narrowband physical downlink control channel (NPDCCH) on the PRB 3. If the PRB 2 and the PRB 3 are different PRBs, the terminal device cannot receive the msg4 retransmitted and delivered by the base station, and does not return the msg4 ACK again. When retransmission of the msg4 reaches a maximum quantity of retransmissions in the base station or exceeds time specified by a contention resolution timer in the base station, access by the terminal device fails.

SUMMARY

Embodiments of this disclosure provide an access method and a related device. A network device can determine, based on a first message received on a data transmission carrier, whether a terminal device successfully resolves a contention problem, to avoid an access failure caused by missing detection of a target ACK, and improve an access success rate of the terminal device.

A first aspect of this disclosure provides an access method. A network device sends a contention resolution message to a terminal device; the network device determines that a target acknowledge character ACK sent by the terminal device is not received on an uplink carrier, where the target ACK is used by the network device to determine whether the terminal device successfully resolves a contention problem; and the network device sends a first uplink grant message to the terminal device on a data transmission carrier, where the first uplink grant message indicates the terminal device to send a first message to the network device on the data transmission carrier, and the first message indicates the network device to determine whether the terminal device successfully resolves the contention problem.

After the network device sends the contention resolution message to the terminal device, if the network device determines that the target ACK sent by the terminal device is not received on the uplink carrier, the network device sends the first uplink grant message to the terminal device on the data transmission carrier. The terminal device may send the first message to the network device on the data transmission carrier based on the first uplink grant message. In this way, the network device can determine, based on the first message received on the data transmission carrier, whether the terminal device successfully resolves the contention problem, to avoid an access failure caused by missing detection of the target ACK, and improve an access success rate of the terminal device.

In a possible implementation of the first aspect, the method further includes:

The network device demodulates the first message.

In this possible implementation, the first message indicates the network device to determine whether the terminal device successfully resolves the contention problem. If the network device can successfully demodulate the first message sent by the terminal device, the network device determines that the terminal device has successfully resolved the contention problem. If the network device cannot successfully demodulate the first message sent by the terminal device, the network device determines that the terminal device does not resolve the contention problem.

In the possible implementation of the first aspect, if the network device successfully demodulates the first message, the network device sends a second uplink grant message to the terminal device on the data transmission carrier, where the second uplink grant message indicates the terminal device to send a second message to the network device on the data transmission carrier.

In this possible implementation, the second uplink grant message indicates the terminal device to send the second message to the network device on the data transmission carrier. For example, it is assumed that the first uplink grant message (UL Grant) authorizes the terminal device to upload the first message of a maximum of 10 bytes. If a size of a msg5 sent by the terminal device to the network device does not exceed 10 bytes, the terminal device may send the first message on an uplink pre-scheduling grant, where the first message includes the msg5. If a size of a msg5 exceeds 10 bytes, the first message sent by the terminal device may include a part of the msg5. The network device receives the first message. After successfully demodulating the first message, the network device continues to perform uplink scheduling. To be specific, the network device may send the second uplink grant message to the terminal device on the data transmission carrier (that is, deliver the UL Grant again on an NPDCCH). The terminal device sends the second message to the network device based on the second uplink grant message.

Optionally, the second message may include a complete msg5. The second uplink grant message limits a size of the second message. If a maximum quantity of bytes of the second message limited by the second uplink grant message is greater than a quantity of bytes of the msg5, the second message may include the complete msg5. Optionally, the second message may include a part of the msg5. The second uplink grant message limits a size of the second message. If a maximum quantity of bytes of the second message limited by the second uplink grant message is less than a quantity of bytes of the msg5, the second message may include the part of the msg5. The network device may send a plurality of second uplink grant messages to the terminal device, and the terminal device sends the complete msg5 to the network device through a plurality of second messages.

In a possible implementation of the first aspect, the first message includes a BSR, where the BSR indicates the size of the second message.

In this possible implementation, if the first message includes a part A of the msg5, the first message may further include the BSR, where the BSR may indicate a size of a part B of the msg5. The part A of the msg5 and the part B of the msg5 may be combined to form a complete set of the msg5. The network device may configure the second uplink grant message based on the buffer status report (BSR), to properly determine the size of the second message, so that the terminal device can send content of the msg5 to the network device more conveniently and efficiently.

In a possible implementation of the first aspect, if the network device fails to demodulate the first message, the network device resends the contention resolution message to the terminal device on the data transmission carrier.

In this possible implementation, if the network device fails to demodulate the first message, the network device continues to trigger uplink hybrid automatic repeat request (HARQ) retransmission on the "data transmission carrier", and resends the contention resolution message to the terminal device. If a quantity of retransmissions performed by the network device reaches a maximum quantity of uplink HARQ retransmissions, and the network device still fails to demodulate the first message, the network device considers that the terminal device has not resolved the contention problem, and access fails.

A second aspect provides an access method. A terminal device receives a contention resolution message sent by a network device; the terminal device receives, on a data transmission carrier, a first uplink grant message sent by the network device, where the first uplink grant message indicates the terminal device to send a first message to the network device on the data transmission carrier, and the first message indicates the network device to determine whether the terminal device successfully resolves a contention problem; and the terminal device sends the first message to the network device on the data transmission carrier.

After the terminal device receives, on the data transmission carrier, the first uplink grant message sent by the network device, the terminal device sends the first message to the network device on the data transmission carrier based on the first uplink grant message. In this way, the network device can determine, based on the first message received on the data transmission carrier, whether the terminal device successfully resolves the contention problem, to avoid an access failure caused by missing detection of a target ACK, and improve an access success rate of the terminal device.

In a possible implementation of the second aspect, if the network device successfully demodulates the first message, the terminal device receives, on the data transmission carrier, a second uplink grant message sent by the network device, where the second uplink grant message indicates the terminal device to send a second message to the network device on the data transmission carrier; and the terminal device sends the second message to the network device.

In this possible implementation, the second uplink grant message indicates the terminal device to send the second message to the network device on the data transmission carrier. For example, it is assumed that the first uplink grant message (UL Grant) authorizes the terminal device to upload the first message of a maximum of 10 bytes. If a size of a msg5 sent by the terminal device to the network device does not exceed 10 bytes, the terminal device may send the first message on an uplink pre-scheduling grant, where the first message includes the msg5. If a size of a msg5 exceeds 10 bytes, the first message sent by the terminal device may include a part of the msg5. The network device receives the first message. After successfully demodulating the first message, the network device continues to perform uplink scheduling. To be specific, the network device may send the second uplink grant message to the terminal device on the data transmission carrier (that is, deliver the UL Grant again on an NPDCCH). The terminal device sends the second message to the network device based on the second uplink grant message.

Optionally, the second message may include a complete msg5. The second uplink grant message limits a size of the second message. If a maximum quantity of bytes of the second message limited by the second uplink grant message is greater than a quantity of bytes of the msg5, the second message may include the complete msg5. Optionally, the second message may include a part of the msg5. The second uplink grant message limits a size of the second message. If a maximum quantity of bytes of the second message limited by the second uplink grant message is less than a quantity of bytes of the msg5, the second message may include the part of the msg5. The network device may send a plurality of second uplink grant messages to the terminal device, and the terminal device sends the complete msg5 to the network device through a plurality of second messages.

In a possible implementation of the second aspect, the first message includes a BSR, where the BSR indicates the size of the second message.

In this possible implementation, if the first message includes a part A of the msg5, the first message may further include the BSR, where the BSR may indicate a size of a part B of the msg5. The part A of the msg5 and the part B of the msg5 may be combined to form a complete set of the msg5. The network device may configure the second uplink grant message based on the BSR, to properly determine the size of the second message, so that the terminal device can send content of the msg5 to the network device more conveniently and efficiently.

In a possible implementation of the second aspect, if the network device fails to demodulate the first message, the terminal device receives, on the data transmission carrier, the contention resolution message resent by the network device.

In this possible implementation, if the network device fails to demodulate the first message, the network device continues to trigger uplink HARQ retransmission on an uplink carrier, and resends the contention resolution message to the terminal device. The terminal device receives, on the uplink carrier, the contention resolution message resent by the network device. If a quantity of retransmissions performed by the network device reaches a maximum quantity of uplink HARQ retransmissions, and the network device still fails to demodulate the first message, the network device considers that the terminal device has not resolved the contention problem, and access fails.

A third aspect provides a network device, where the network device includes at least one processor, a memory, and a communication interface. The processor is coupled to the memory and the communication interface. The memory is configured to store instructions, the processor is configured to execute the instructions, and the communication interface is configured to communicate with another device under control of the processor. When the instructions are executed by the processor, the processor is enabled to perform the method in any one of the first aspect or the possible implementations of the first aspect.

A fourth aspect provides a terminal device, where the terminal device includes at least one processor, a memory, and a communication interface. The processor is coupled to the memory and the communication interface. The memory is configured to store instructions, the processor is configured to execute the instructions, and the communication interface is configured to communicate with another device under control of the processor. When the instructions are executed by the processor, the processor is enabled to perform the method in any one of the second aspect or the possible implementations of the second aspect.

A fifth aspect provides a communication apparatus, including a processor, where the processor is coupled to a memory, the memory is configured to store a computer program or instructions, and the processor is configured to execute the computer program or the instructions in the memory, to enable the communication apparatus to perform the method in any one of the first aspect or the possible implementations of the first aspect, or enable the communication apparatus to perform the method in any one of the second aspect or the possible implementations of the second aspect.

A sixth aspect provides a computer-readable storage medium, where the computer-readable storage medium is configured to store a computer program. When the computer program is run on a computer, the computer is enabled to perform the method in any one of the first aspect or the possible implementations of the first aspect, or the computer is enabled to perform the method in any one of the second aspect or the possible implementations of the second aspect.

A seventh aspect provides a chip, including a processor and a communication interface, where the processor is configured to read instructions to perform the method in any one of the first aspect or the possible implementations of the first aspect, or to perform the method in any one of the second aspect or the possible implementations of the second aspect.

An eighth aspect provides a communication system, including the network device in any one of the first aspect or the possible implementations of the first aspect, and the terminal device in any one of the second aspect or the possible implementations of the second aspect.

It can be learned from the foregoing technical solutions that embodiments of this application have the following advantages:

In this disclosure, after the network device sends the contention resolution message to the terminal device, if the network device determines that the target ACK sent by the terminal device is not received on the uplink carrier, the network device sends the first uplink grant message to the terminal device on the data transmission carrier. The terminal device may send the first message to the network device on the data transmission carrier based on the first uplink grant message. In this way, the network device can determine, based on the first message received on the data transmission carrier, whether the terminal device successfully resolves the contention problem, to avoid the access failure caused by the missing detection of the target ACK, and improve the access success rate of the terminal device.

DESCRIPTION OF EMBODIMENTS

Figure 1:
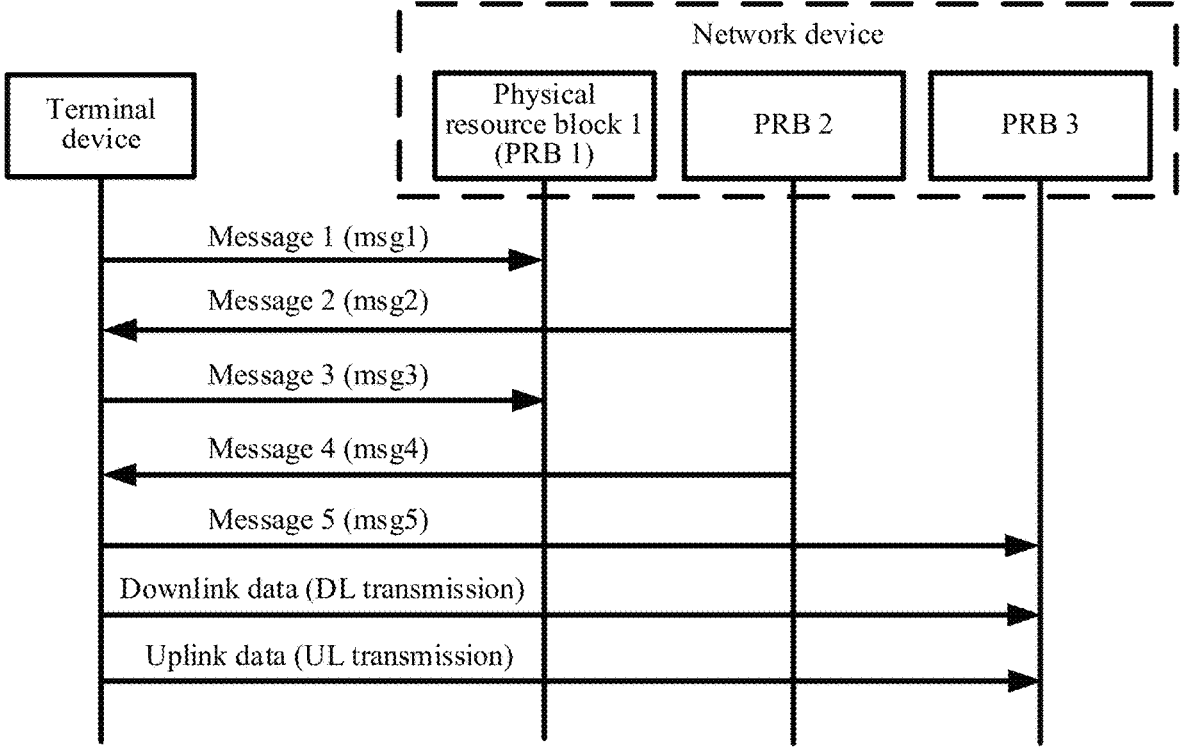
FIG. 1 is a schematic diagram of an existing access procedure.

The following describes embodiments with reference to accompanying drawings. A person of ordinary skill in the art may learn that with development of technologies and emergence of new scenarios, technical solutions provided in embodiments of this application are also applicable to similar technical problems.

In the specification, claims, and accompanying drawings, terms "first", "second", and the like are intended to distinguish between similar objects but do not necessarily indicate a specific order or sequence. It should be understood that the data termed in such a way may be interchangeable in appropriate circumstances, so that embodiments described herein can be implemented in an order other than the order illustrated or described herein.

In embodiments, words such as "example" or "for example" are used to represent giving an example, an illustration, or a description. Any embodiment or design scheme described as an "example" or "for example" in embodiments of this application should not be explained as being more preferred or having more advantages than another embodiment or design scheme. Exactly, use of the word "example", "for example", or the like is intended to present a related concept in a specific manner for ease of understanding.

The term "and/or" describes only an association relationship between associated objects and indicates that three relationships may exist. For example, A and/or B may indicate the following three cases: Only A exists, both A and B exist, and only B exists, where A and B may be singular or plural. In addition, in the descriptions of this application, "a plurality of" means two or more unless otherwise specified. "At least one of the following items (pieces)" or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

The technical solutions in embodiments of this application may be applied to various communication systems, for example, a long term evolution (LTE) system, an LTE frequency division duplex (FDD) system, an LTE time division duplex (TDD) system, a 5th generation (5G) system or a new radio (NR) system, and a future mobile communication system.

Narrowband internet of things (NB-IoT) is a technology that can be widely used around the world, and is also an important branch of internet of everything. The NB-IoT features wide coverage, a large quantity of connections, a high rate, low costs, low power consumption, an excellent architecture, and the like.

In an NB-IoT multi-carrier transmission technology, a quantity of carriers in a single cell is increased, so that UE can be allocated to a carrier that is not occupied to transmit data, to improve cell capacity. Transmission carriers of a multi-carrier cell are classified into an anchor carrier and a non-anchor carrier. The anchor carrier is a default transmission carrier and supports all signaling and data transmission in a connected mode and an idle mode. The non-anchor carrier is a newly introduced transmission carrier.

In a random access process of the NB-IoT that supports multi-carrier transmission, a base station broadcasts, in a system information block (SIB) 22, an uplink non-anchor carrier that supports a random access channel (RACH) and a corresponding downlink non-anchor (DL non-anchor) carrier that delivers a message 2 (msg2) and/or a message 4 (msg4).

FIG. 1 is a schematic diagram of an existing access procedure.

Refer to FIG. 1. A terminal device having a multi-carrier RACH access capability selects an available physical random access channel (PRACH) resource, namely, a physical resource block (PRB), between an anchor carrier and a UL non-anchor carrier. If the carrier selected by the terminal device is a PRB 1, a corresponding DL non-anchor carrier of the PRB 1 in a configuration of a SIB 22 is a PRB 2. It may be understood that if the PRB 1 is the anchor carrier, the PRB 2 is the anchor carrier. A network device configures, through a message 4 (msg4), the terminal device on another carrier PRB 3 to transmit a message 5 (msg5). In addition, subsequent service-related signaling and data between the network device and the terminal device are all transmitted on the PRB 3. Optionally, the PRB 1, the PRB 2, and the PRB 3 may be a same PRB, or may be different PRBs. In the foregoing RACH procedure, after the network device sends the msg4 to the terminal device, to ensure that the terminal device successfully receives the msg4, the terminal device returns a msg4 acknowledge character (acknowledge character, ACK) to the network device. If the network device does not receive the msg4 ACK sent by the terminal device, the network device considers that the terminal device has not resolved a contention problem, and still retransmits the msg4 to the terminal device on the PRB 2.

If the terminal device has received the msg4, but the network device does not receive the msg4 ACK sent by the terminal device due to factors such as a poor uplink signal, existence of strong uplink interference, or the like, a base station retransmits the msg4 on the PRB 2. However, the terminal device needs to send the msg5 on the PRB 3, so the terminal device monitors a narrowband physical downlink control channel (NPDCCH) on the PRB 3. If the PRB 2 and the PRB 3 are different PRBs, the terminal device cannot receive the msg4 retransmitted and delivered by the base station, and does not return the msg4 ACK again. When retransmission of the msg4 reaches a maximum quantity of retransmissions in the base station or exceeds time specified by a contention resolution timer in the base station, access by the terminal device fails.

In this NB-IoT scenario, in the existing random access procedure, the base station can determine, only depending on whether the msg4 ACK sent by the terminal device is received, whether the contention problem in random access is resolved. If a carrier sent by the base station is inconsistent with a carrier monitored by the terminal device, there is a risk of missing detection of the msg4 ACK, and a risk of a random access failure of the terminal device is high.

To resolve the foregoing problems, this application provides an access method and a related device. After a network device sends a contention resolution message to a terminal device, if the network device determines that a target ACK sent by the terminal device is not received on an uplink carrier, the network device sends a first uplink grant message to the terminal device on a data transmission carrier. The terminal device may send a first message to the network device on the data transmission carrier based on the first uplink grant message. In this way, the network device can determine, based on the first message received on the data transmission carrier, whether the terminal device successfully resolves a contention problem, to avoid an access failure caused by missing detection of the target ACK, improve an access success rate of the terminal device, and reduce a service delay.

Figure 2:
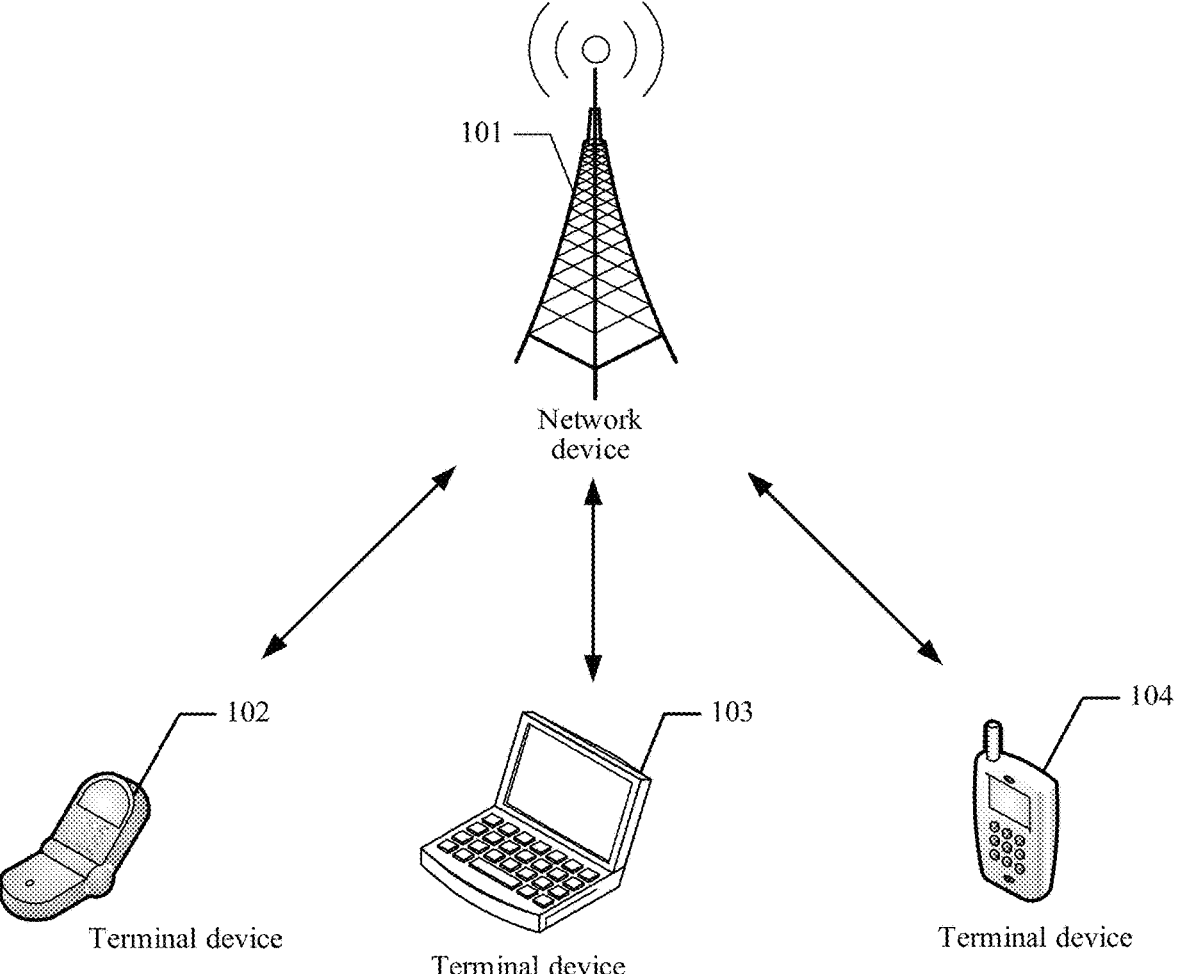
FIG. 2 is a schematic diagram of an application scenario of a communication system according to this disclosure.

FIG. 2 is a schematic diagram of an application scenario of a communication system according to this disclosure.

With reference to FIG. 2, terminal devices and a network device form a communication system.

The communication system provided in this embodiment includes a network device 101, a terminal device 102, a terminal device 103, and a terminal device 104.

The terminal device 102 exchanges data with the network device 101, the terminal device 103 exchanges data with the network device 101, and the terminal device 104 exchanges data with the network device 101.

In this embodiment, only one network device and three terminal devices are used as an example for description. In actual application, optionally, this embodiment may include a plurality of network devices and more or fewer terminal devices than those provided in the embodiment of FIG. 2. A quantity of network devices and a quantity of terminal devices are not limited in this embodiment.

The network device 101 in this embodiment may be any device having a wireless transceiver function. The network device 101 includes a base station (BS), which may be a device that is deployed in a radio access network and that can perform wireless communication with the terminal device. The base station may be in a plurality of forms, such as a macro base station, a micro base station, a relay station, and an access point. The base station in this embodiment of this application may be a base station in a 5G system or a base station in an LTE system. The base station in the 5G system may also be referred to as a transmission reception point (TRP) or a next generation NodeB (generation NodeB, gNB or gNodeB). In embodiments, an apparatus configured to implement a function of the network device may be a network device, or may be an apparatus, for example, a chip system, that can support the network device in implementing the function. The apparatus may be mounted in the network device or used in a matching manner with the network device. In technical solutions provided in embodiments, the technical solutions provided in embodiments of this application are described by using an example in which the apparatus for implementing the function of the network device is the network device.

The terminal device in embodiments may be a device that provides a user with voice and/or data connectivity, a handheld device with a wireless connection function, or another processing device connected to a wireless modem. The terminal device may be a mobile terminal, for example, a mobile phone (or referred to as a "cellular" phone), and a computer that has a mobile terminal. For example, the terminal device may be a portable, pocket-sized, handheld, computer built-in, or in-vehicle mobile apparatus. These mobile apparatuses exchange voice and/or data with the network device. For example, the terminal device is a device such as a personal communication service (PCS) phone, a cordless telephone set, a session initiation protocol (SIP) phone, a wireless local loop (WLL) station, or a personal digital assistant (PDA). The terminal device may also be referred to as a system, a subscriber unit, a subscriber station, a mobile station (mobile station), a remote station (remote station), an access point, a remote terminal, an access terminal, a user agent, a user device or user equipment, a subscriber station, a remote station, terminal equipment (TE), a terminal, a wireless communication device, and a user agent or a user apparatus. In addition, the terminal device may alternatively be a chip system configured to implement a function of the UE. This is not specifically limited herein.

In the communication system provided in this embodiment of this application, the terminal device may access the network device and communicate with the network device. For example, one network device may manage one or more (for example, three or six) cells, and the terminal device may access the network device in at least one of the one or more cells, and communicate with the network device in the cell in which the terminal device is located. In embodiments of this application, at least one may be one, two, three, or more. This is not limited in embodiments of this application.

In this application, for ease of description, the terminal device initiates RACH access on a PRB 1, and the PRB 1 is referred to as an "uplink carrier" below. A downlink carrier corresponding to the PRB 1 in a SIB 22 is a PRB 2, and the PRB 2 is referred to as a "downlink carrier" below. An uplink and downlink carrier configured by the base station in a msg4 is a PRB 3, and the PRB 3 is referred to as a "data transmission carrier" below.

Based on the communication system described in FIG. 2, an access method provided in embodiments of this application is described.

Figures 3, 4, 5:
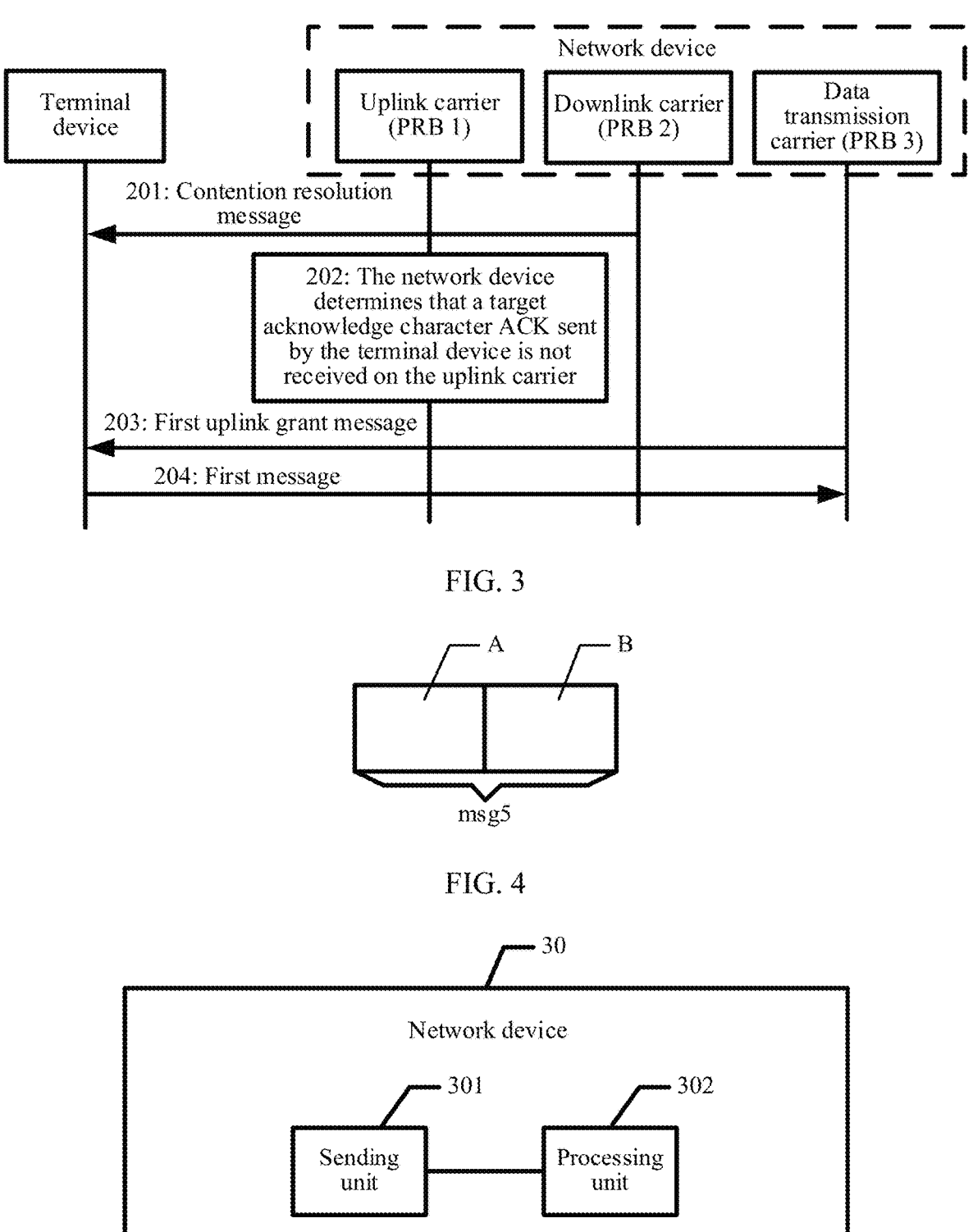
FIG. 3 is a schematic diagram of an embodiment of an access method according to this disclosure.
FIG. 4 is a schematic diagram of another embodiment of an access method according to this disclosure.
FIG. 5 is a schematic diagram of a structure of a network device according to this disclosure.

FIG. 3 is a schematic diagram of an embodiment of an access method according to this application.

Refer to FIG. 3. An embodiment of the access method according to this embodiment of this application includes step 201 to step 204.

201: A network device sends a contention resolution message to a terminal device, and correspondingly, the terminal device receives the contention resolution message sent by the network device.

In this application, in a random access process, after the network device resolves a contention problem, the network device sends the contention resolution message (msg4) to the terminal device on a downlink carrier (PRB 2), so that the terminal device determines, based on the contention resolution message (msg4), whether the terminal device meets a contention condition. If the terminal device determines that the terminal device meets the contention condition, the terminal device sends a target ACK to the network device.

202: The network device determines that the target ACK sent by the terminal device is not received on an uplink carrier (PRB 1).

In this application, the target ACK is used by the network device to determine whether the terminal device successfully resolves the contention problem. If the terminal device receives the contention resolution message sent by the network device, and returns the target ACK to the network device, the network device determines that the terminal device successfully resolves the contention problem. If the network device determines that the target ACK sent by the terminal device is not received on the uplink carrier (PRB 1), the network device may take other measures to determine whether the terminal device successfully resolves the contention problem.

203: The network device sends a first uplink grant message to the terminal device on a data transmission carrier, and correspondingly, the terminal device receives, on the data transmission carrier, the first uplink grant message sent by the network device.

In this disclosure, the first uplink grant message indicates the terminal device to send a first message to the network device on the data transmission carrier.

For example, if the network device determines that the target ACK sent by the terminal device is not received on the uplink carrier, the network device may deliver the first uplink grant message (UL Grant) on the data transmission carrier (PRB 3). The UL grant may authorize the terminal device to send the first message to the network device on the data transmission carrier. A size of the first message is limited by the UL grant. Optionally, the size of the message may be 20 bytes, the size of the message may be 50 bytes, or the size of the message may be any byte. This is not specifically limited herein.

204: The terminal device sends the first message to the network device on the data transmission carrier.

In this disclosure, the first message indicates the network device to determine whether the terminal device successfully resolves the contention problem. If the network device can successfully demodulate the first message sent by the terminal device, the network device determines that the terminal device has successfully resolved the contention problem.

Optionally, if the network device successfully demodulates the first message sent by the terminal device, the network device sends a second uplink grant message to the terminal device on the data transmission carrier.

The second uplink grant message indicates the terminal device to send a second message to the network device on the data transmission carrier. For example, it is assumed that the first uplink grant message (UL Grant) authorizes the terminal device to upload the first message of a maximum of 20 bytes. If a size of a msg5 sent by the terminal device to the network device does not exceed 20 bytes, the terminal device may send the first message on an uplink pre-scheduling grant, where the first message includes the msg5. If a size of a msg5 exceeds 20 bytes, the first message sent by the terminal device may include a part of the msg5. The network device receives the first message. After successfully demodulating the first message, the network device continues to perform uplink scheduling. To be specific, the network device may send the second uplink grant message to the terminal device on the data transmission carrier (that is, deliver the UL Grant again on an NPDCCH). The terminal device sends the second message to the network device based on the second uplink grant message.

Optionally, the second message may include a complete msg5. The second uplink grant message limits a size of the second message. If a maximum quantity of bytes of the second message limited by the second uplink grant message is greater than a quantity of bytes of the msg5, the second message may include the complete msg5. Optionally, the second message may include a part of the msg5. The second uplink grant message limits a size of the second message. If a maximum quantity of bytes of the second message limited by the second uplink grant message is less than a quantity of bytes of the msg5, the second message may include the part of the msg5. The network device may send a plurality of second uplink grant messages to the terminal device, and the terminal device sends the complete msg5 to the network device through a plurality of second messages.

FIG. 4 is a schematic diagram of another embodiment of an access method according to this application.

With reference to FIG. 4, optionally, if a first message includes a part A of a msg5, the first message may further include a BSR, and the BSR may indicate a size of a part B of the msg5. The part A of the msg5 and the part B of the msg5 may be combined to form a complete set of the msg5. A network device may configure a second uplink grant message based on the BSR, to properly determine a size of a second message, so that a terminal device can send content of the msg5 to the network device more conveniently and efficiently.

Optionally, if the network device fails to demodulate the first message, the network device resends a contention resolution message to the terminal device on a downlink carrier.

For example, if the network device fails to demodulate the first message, the network device continues to trigger uplink HARQ retransmission on the downlink carrier, and resends the contention resolution message to the terminal device. If a quantity of retransmissions performed by the network device reaches a maximum quantity of uplink HARQ retransmissions, and the network device still fails to demodulate the first message, access by the terminal device fails. Optionally, the network device may retransmit the contention resolution message to the terminal device for a plurality of times. The contention resolution message may be retransmitted before the first message is demodulated, or the contention resolution message may be retransmitted after the first message is demodulated. This is not specifically limited herein.

The foregoing embodiment provides different implementations of the access method. The following provides a network device 30. As shown in FIG. 5, the network device 30 is configured to perform the steps performed by the network device in the foregoing embodiment. For details about the execution steps and corresponding beneficial effects, refer to the foregoing corresponding embodiments. Details are not described herein again. The network device 30 includes:

a sending unit 301, configured to send a contention resolution message to a terminal device; and a processing unit 302, configured to determine that a target acknowledge character ACK sent by the terminal device is not received on an uplink carrier, where the target ACK is used by the network device to determine whether the terminal device successfully resolves a contention problem.

The sending unit 301 is configured to send a first uplink grant message to the terminal device on a data transmission carrier, where the first uplink grant message indicates the terminal device to send a first message to the network device on the data transmission carrier, and the first message indicates the network device to determine whether the terminal device successfully resolves the contention problem.

In a possible implementation, the processing unit 302 is further configured to demodulate the first message.

In a possible implementation, if the processing unit 302 successfully demodulates the first message, the sending unit 301 is configured to send a second uplink grant message to the terminal device on the data transmission carrier, where the second uplink grant message indicates the terminal device to send a second message to the network device on the data transmission carrier.

In a possible implementation, the first message includes a BSR, where the BSR indicates a size of the second message.

In a possible implementation, if the processing unit 302 fails to demodulate the first message, the sending unit 301 is configured to resend the contention resolution message to the terminal device on the data transmission carrier.

It should be noted that, content such as information exchange between the modules of the network device 30 and the execution processes thereof is based on a same concept as the method embodiments of this application, and achieves same technical effects as the method embodiments of the present invention. For specific content, refer to the descriptions in the foregoing method embodiments of this application. Details are not described herein again.

Figure 6:
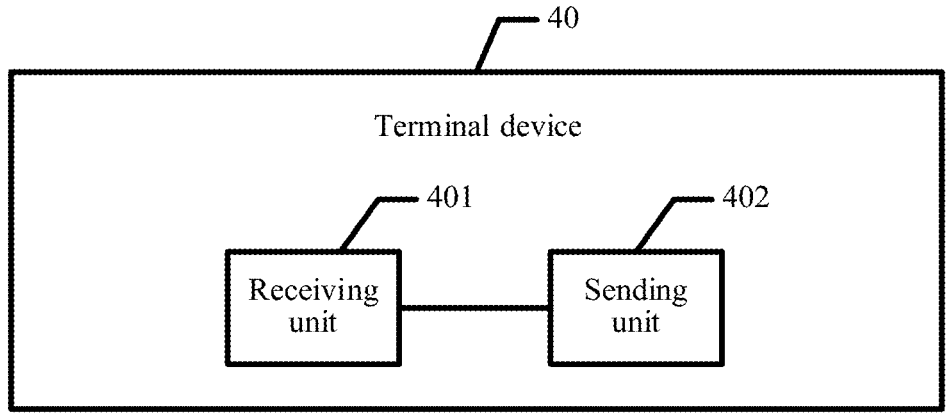
FIG. 6 is a schematic diagram of a structure of a terminal device according to this disclosure.

The foregoing embodiment provides different implementations of the network device 30. The following provides a terminal device 40. As shown in FIG. 6, the terminal device 40 is configured to perform the steps performed by the terminal device in the foregoing embodiment. For details about the execution steps and corresponding beneficial effects, refer to the foregoing corresponding embodiments. Details are not described herein again. The terminal device 40 includes:

a receiving unit 401, configured to:

receive a contention resolution message sent by a network device; and receive, on a data transmission carrier, a first uplink grant message sent by the network device, where the first uplink grant message indicates the terminal device to send a first message to the network device on the data transmission carrier, and the first message indicates the network device to determine whether the terminal device successfully resolves a contention problem; and a sending unit 402, configured to send the first message to the network device on the data transmission carrier.

In a possible implementation, if the network device successfully demodulates the first message, the receiving unit 401 is configured to receive, on the data transmission carrier, a second uplink grant message sent by the network device, where the second uplink grant message indicates the terminal device to send a second message to the network device on the data transmission carrier; and the sending unit 402 is configured to send the second message to the network device.

In a possible implementation, the first message includes a BSR, where the BSR indicates a size of the second message.

In a possible implementation, if the network device fails to demodulate the first message, the receiving unit 401 is configured to receive, on the data transmission carrier, the contention resolution message resent by the network device.

It should be noted that, content such as information exchange between the modules of the terminal device 40 and the execution processes thereof is based on a same concept as the method embodiments of this application, and achieves same technical effects as the method embodiments of the present invention. For specific content, refer to the descriptions in the foregoing method embodiments of this application. Details are not described herein again.

Figure 7:
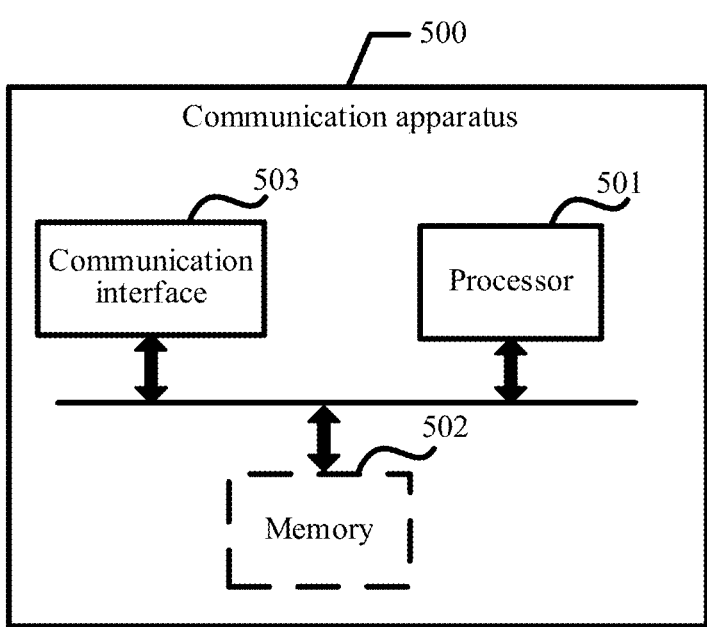
FIG. 7 is a schematic diagram of a structure of a communication apparatus according to this disclosure.

FIG. 7 is a schematic diagram of a communication apparatus 500 according to an embodiment of this application. The communication apparatus 500 is configured to implement operations of the network device and the terminal device in the foregoing embodiments. The communication apparatus 500 includes a processor 501 and a communication interface 503. Optionally, the communication apparatus further includes a memory 502. The communication interface 503 is configured to communicate with another device.

In the foregoing embodiments, the method performed by the network device or the terminal device may be implemented by the processor 501 by invoking a program stored in a memory (which may be the memory 502 in the network device or the terminal device, or may be an external memory). In other words, an apparatus used in the network device or the terminal device may include the processor 501, and the processor 501 invokes the program in the memory to perform the method performed by the terminal device and the network device in the foregoing method embodiments. The processor herein may be an integrated circuit having a signal processing capability, for example, a CPU. The apparatus used in the terminal device and the network device may be implemented by one or more integrated circuits configured to implement the foregoing methods, for example, one or more ASICs, one or more microprocessors DSPs, one or more FPGAs, or a combination of at least two of the integrated circuit forms. Alternatively, the foregoing implementations may be combined.

For example, functions/implementation processes of the processing units in FIG. 5 and FIG. 6 may be implemented by the processor 501 in the communication apparatus 500 shown in FIG. 7 by invoking computer-executable instructions stored in the memory 502, and functions/implementation processes of the transceiver units in FIG. 5 and FIG. 6 may be implemented by the communication interface 503 in the communication apparatus 500 shown in FIG. 7.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In several embodiments provided in this application, it should be understood that the disclosed system, apparatus, and method may be implemented in other manners. For example, the described apparatus embodiments are merely examples. For example, division into the units is merely logical function division and there may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

It should be noted that descriptions in this specification are applicable to all embodiments. To avoid repetition, details are not described in each embodiment. It should be understood that an "embodiment" mentioned throughout the specification means a particular feature, structure, or feature related to the embodiment, and the particular feature, structure, or feature may be combined in one or more embodiments in any proper manner. It should be understood that sequence numbers of the foregoing processes do not mean execution sequences in embodiments of the present disclosure. The execution sequences of the processes should be determined according to functions and internal logic of the processes, and should not be construed as any limitation on the implementation processes of embodiments of the present invention.

What is claimed is:

1. An access method, comprising:

sending, by a network device, a contention resolution message to a terminal device;

determining, by the network device, that a target acknowledge (ACK) character sent by the terminal device indicating successful resolution by the terminal device of a contention problem is not received on an uplink carrier;

sending, by the network device on a data transmission carrier, a first uplink grant message to the terminal device, the first uplink grant message instructing the terminal device to send a first message to the network device on the data transmission carrier instructing the network device to determine whether the terminal device has successfully resolved the contention problem;

demodulating, by the network device, the first message; and sending, by the network device on the data transmission carrier, a second uplink grant message to the terminal device when the network device successfully demodulates the first message, the second uplink grant message instructing the terminal device to send a second message to the network device on the data transmission carrier.

2. The access method according to claim 1, wherein the first message comprises a buffer status report (BSR) indicating a size of the second message.

3. The access method according to claim 1, the network device resending the contention resolution message to the terminal device on the data transmission carrier when the network device fails to demodulate the first message.

4. A network device, comprising:

at least one processor; and one or more memories including computer instructions that, when executed by the at least one processor, cause the network device to perform operations comprising:

sending a contention resolution message to a terminal device;

determining that a target acknowledge (ACK) character sent by the terminal device indicating successful resolution by the terminal device of a contention problem is not received on an uplink carrier;

sending on a data transmission carrier a first uplink grant message to the terminal device, the first uplink grant message instructing the terminal device to send a first message to the network device on the data transmission carrier instructing the network device to determine whether the terminal device has successfully resolved the contention problem;

demodulating the first message; and sending on the data transmission carrier, a second uplink grant message to the terminal device when the network device successfully demodulates the first message, the second uplink grant message instructing the terminal device to send a second message to the network device on the data transmission carrier.

5. The network device according to claim 4, the first message comprising a buffer status report (BSR) indicating a size of the second message.

6. The network device according to claim 4, execution of the instructions by the at least one processor further causing the network device to perform operations comprising:

resending the contention resolution message to the terminal device on the data transmission carrier when the network device fails to demodulate the first message.

7. A terminal device, comprising:

at least one processor; and one or more memories including computer instructions that, when executed by the at least one processor, cause the terminal device to perform operations comprising:

receiving a contention resolution message sent by a network device;

receiving, on a data transmission carrier, a first uplink grant message sent by the network device, the first uplink grant message instructing the terminal device to send a first message to the network device on the data transmission carrier instructing the network device to determine whether the terminal device has successfully resolved a contention problem;

sending the first message to the network device on the data transmission carrier;

sending on the data transmission carrier, a second uplink grant message sent by the network device when the network device successfully demodulates the first message, receiving, the second uplink grant message instructing the terminal device to send a second message to the network device on the data transmission carrier; and sending the second message to the network device.

8. The terminal device according to claim 7, the first message comprising a buffer status report (BSR) indicating a size of the second message.

9. The terminal device according to claim 7, execution of the instructions by the at least one processor further causing the network device to perform operations comprising:

receiving, on the data transmission carrier, the contention resolution message resent by the network device when the network device fails to demodulate the first message.

* * * * *